UNITED STATES PATENT OFFICE.

ROYAL W. BARNARD, OF FAYETTE, IOWA.

IMPROVEMENT IN PROCESSES FOR PURIFYING RANCID BUTTER.

Specification forming part of Letters Patent No. 198,334, dated December 18, 1877; application filed October 12, 1877.

*To all whom it may concern:*

Be it known that I, ROYAL W. BARNARD, of the city and county of Fayette, and State of Iowa, have invented a new and Improved Process for Purifying Rancid Butter; and I do hereby declare that the following is a full, clear, and exact description of the same.

The object of my invention is to provide an economical mode of removing the sour or rancid taste from old or "tubby" butter, and the recovery of the pure butter-globules without injury to their organized granular character or their flavor.

To this end my invention consists in the use of special brines, hereinafter described, to correct the sour or rancid taste in the butter.

In carrying out my invention I have a brine solution prepared specially for this purpose. It is known to butter-workers that the rancid or sour taste in butter is due not to any decomposition of the butter-globules, but to the decomposition or fermentation of the foreign matters, which are held to the butter-globules in the nature of a soluble slime. It is also known that these sour or rancid butters can be divested of their objectionable taste by treatment with heat to melt the butter; but this mode destroys the organization of the butter globules or grains, and causes them to run together to form an oil which is not fit for table use, and which cannot be restored to its former condition.

To redeem this damaged butter without destroying the grain or texture of the same, I employ a special brine, composed of certain harmless ingredients, as follows: Water, ten gallons; saleratus, one pound; salt, two pounds, and sugar, two pounds—dissolved together. Then take, for a second solution, one-half pound tartaric acid and one gallon of water. In the first solution I place the rancid butter, and then pour on the second solution, and stir the whole thoroughly together. After allowing it to stand some ten or fifteen minutes, according to circumstances, this brine is run off, and the butter may then be worked through a fresh brine containing only the salt and sugar.

If the butter to be handled is very bad, a larger proportion of the saleratus and tartaric acid is used, and vice versa. The effect of the saleratus and tartaric acid upon this kind of butter is to wash off mechanically the decomposing foreign substances from the surface of the globules by the active effervescence, and also, by its alkaline character, to neutralize the developed acids which make the butter rancid.

Instead of saleratus I may use any of the other alkaline carbonates, and I may use citric in the place of tartaric acid, if found desirable.

Having thus described my invention, what I claim as new is—

The method of reclaiming sour, "tubby," or rancid butter, which consists in treating the same with a solution of brine containing an alkaline carbonate mixed with a solution of tartaric acid, or its equivalent, for the purpose described.

ROYAL W. BARNARD.

Witnesses:
JOHN SCOTT,
W. E. HUSTON.